US007594239B2

(12) United States Patent
Chang et al.

(10) Patent No.: US 7,594,239 B2
(45) Date of Patent: Sep. 22, 2009

(54) MAGNETIC ACTUATOR

(75) Inventors: Chii-How Chang, Taoyuan Hsien (TW); Sean Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 810 days.

(21) Appl. No.: 11/153,549

(22) Filed: Jun. 16, 2005

(65) Prior Publication Data

US 2005/0281146 A1 Dec. 22, 2005

(30) Foreign Application Priority Data

Jun. 18, 2004 (TW) .............................. 93209635 U

(51) Int. Cl.
*G11B 17/03* (2006.01)

(52) U.S. Cl. ...................................................... 720/600

(58) Field of Classification Search ................. 720/600; 360/264.8, 264.7, 264.1, 265.6
See application file for complete search history.

(56) References Cited

U.S. PATENT DOCUMENTS 6,462,914 B1 * 10/2002 Oveyssi et al. ........... 360/264.8
7,161,768 B1 * 1/2007 Oveyssi .................. 360/264.8
7,239,052 B2 * 7/2007 Chang et al. .................. 310/15
2006/0028071 A1 * 2/2006 Chang et al. .................. 310/12
2006/0028312 A1 * 2/2006 Chang et al. ................ 335/229
2008/0061635 A1 * 3/2008 Saitou et al. .................. 310/13
2008/0148301 A1 * 6/2008 Masaoka et al. ............ 720/601

* cited by examiner

*Primary Examiner*—Allen T Cao
(74) *Attorney, Agent, or Firm*—Birch, Stewart, Kolasch & Birch, LLP

(57) ABSTRACT

A magnetic actuator. The magnetic actuator comprises a first magnet, a second magnet, a first yoke, and a first coil. The second magnet is arranged axially with respect to the first magnet with repulsion therebetween. The first yoke is disposed between the first magnet and the second magnet, and the magnetic field lines produced by the first magnet and the second magnet extend from the first yoke. The first coil surrounds and corresponds to the first yoke. When a current is occurred in the first coil, the magnetic force generated between the first magnet and the second magnet will actuates the first coil to move axially with respect to the first and second magnets.

22 Claims, 6 Drawing Sheets

MAGNETIC ACTUATOR

BACKGROUND

The invention relates to a magnetic actuator, and in particular to a magnetic actuator applied in a reflecting mirror actuator.

A magnetic actuator drives electronic components by utilizing a magnet surrounded by coils. The magnet provides magnetic field. When an electric current is occurried in the coil, current flow is perpendicular to magnetic field lines of the magnet. According to Ampere's Law, relative motion is produced between the coil and the magnet. Resultant motion produced by the magnetic actuator can be applied in optical devices or other conventional mechanism.

In FIG. 1, a conventional magnetic actuator is shown. The conventional magnetic actuator 1 comprises a hollow cylindrical magnet 10, a coil 12, and a yoke base 14. The magnet 10 can be a permanent magnet with external and internal sides having opposite poles. In this case, the external side has a North pole, and the internal side a South pole. The coil 12 encircles the magnet 10, for electric current to flow therethrough. The yoke base 14 is connected to a side of the magnet 10. The magnetic field line 100 produced by the magnet 10 extends radially from an external edge of the magnet 10, passes through the coil 12, and enters an internal edge of the magnet 10, as shown in FIG. 1. As a result, if electric current flows through the coil 12, the electric current is perpendicular to the magnetic field line. Thus, coil 12 will move therefore axially with respect to the magnet 10 as shown by the arrow in FIG. 1. The magnetic actuator can be installed in a mechanism that requires relative motion between elements.

Another conventional magnetic actuator is shown in FIG. 2A. The magnetic actuator 2 comprises a solid cylindrical magnet 20, a yoke 25, a coil 22, and a yoke base 24. The magnet 29 is also a permanent magnet with an upper end, North pole, and a lower end, South pole. The yoke 25 is located above the magnet 20 and connected thereto. The coil 22 encircles the yoke 25. The yoke base 24 is below the magnet 20. The magnetic field line 200 produced by the magnet 20 emits axially from the upper end thereof, traveling from the yoke 25 through the coil 22 and entering the magnet 20 from the yoke base 24. If electric current flows through the coil 22, current flow is perpendicular to the magnetic field line such that relative axial motion is produced between the coil 22 and the magnet 20.

Another magnetic actuator is shown in FIG. 2B. The difference from the above mentioned is that a side board 26 is connected to the yoke base 24 located below the magnet 20. The side board 26 extends from the yoke base 24 to the coil 22 such that the magnetic field line 200 easily extends along the side board 26 and the yoke base 24, and the magnetic field line 200 passing through the coil 22 can be concentrated, thereby providing improved actuation.

However, the actuation of the conventional magnetic actuators is still deficient. For example, in an optical device for transferring light produced from a light source to a light with predetermined intensity and color, the light is projected to produce images. A reflecting mirror actuator is a main component of the optical device to provide high image resolution. The reflecting mirror actuator is commonly provided with a magnetic actuator to direct and project light in different directions, as shown in FIGS. 3A and 3B. The reflecting mirror actuator 3 comprises a reflecting mirror 31 and a base 32 with a pivot point 33 therebetween. The reflecting mirror 31 can rotate by the pivot point 33 as a center point. A magnetic actuator 30 is disposed at a side of the reflecting mirror 31 and the base 32 to control the movement of the reflecting mirror 31. When the coil of the magnetic actuator 30 has no current therethrough, as shown in FIG. 3A, the light is reflected by the reflecting mirror 31 in a predetermined position. When a current is occurred in the coil of the magnetic actuator 30, as shown in FIG. 3B, the magnetic actuator 30 actuates the reflecting mirror 31 to rotate by the pivot point 33 such that the light reflected by the reflecting mirror 31 changes to another predetermined position. The reflecting mirror actuator is required to operate rapidly such that the light emitting directions can be changed immediately and resolution increased. Thus, actuation of the conventional actuators is often insufficient because of its structure. In order to satisfy demands for high actuation, the actuator must be enlarged, whereby requirements for more compact design cannot be met. If electric current is increased in the coil, there is also a problem of excessive power consumption. Thus, there is still a need to provide a compact magnetic actuator with high actuation without increasing current of a coil without increased size.

SUMMARY

Embodiments of the invention provide a magnetic actuator with dense magnetic field lines and high actuation without increased size or current.

Further provided is a magnetic actuator applicable in a reflecting mirror actuator of an optical device, increasing actuation thereof.

The magnetic actuator comprises two magnets arranged axially with co-repulsion with a yoke disposed therebetween. The coil surrounds and is positioned corresponding to the yoke. Magnetic field lines produced by the magnets extend from the yoke, pass through the coil, and enter the other ends of the magnets. The distance between magnets is appropriately reduced such that density of the magnetic field lines is increased, thereby increasing magnetic force of the coil.

Accordingly, a gap between the magnets is less than twice the thickness of any magnet.

The disclosed structure of the magnet actuator can be arranged differently or overlap. Two yokes can be disposed respectively between two sets of two magnets arranged axially with repulsion therebetween. Each set comprises a coil, surrounding each yoke.

BRIEF DESCRIPTION OF THE DRAWINGS

The invention can be more fully understood by reading the subsequent detailed description in conjunction with the examples and references made to the accompanying drawings, wherein.

DETAILED DESCRIPTION

Figure 1:
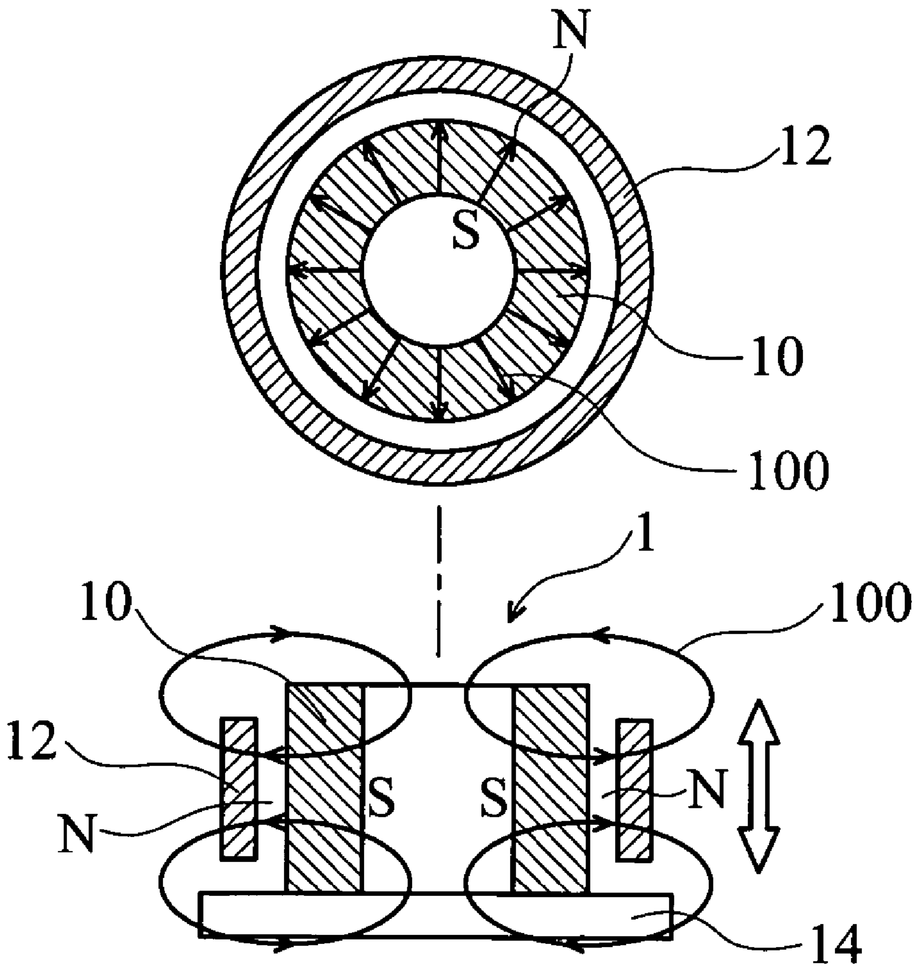
FIG. 1 (RELATED ART)
FIG. 1 is a schematic top and side cross section of a conventional magnetic actuator.
Figure 2A:
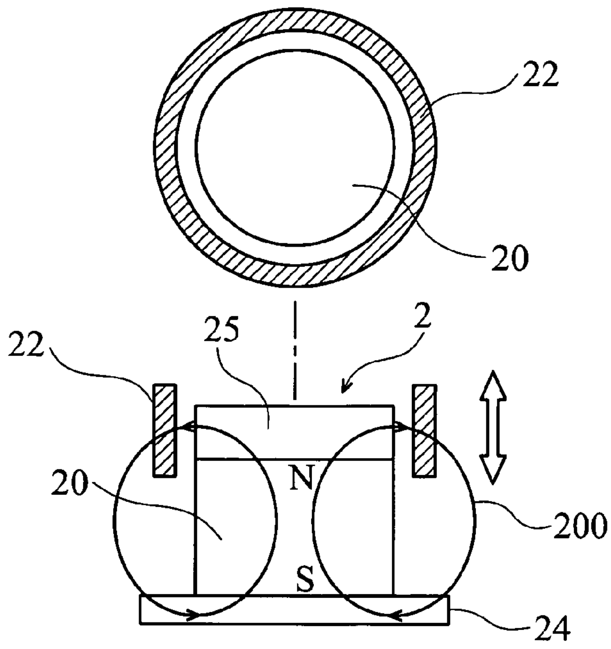
FIG. 2A (RELATED ART)
FIG. 2A is a schematic top and side cross section of another conventional magnetic actuator.
Figure 2B:
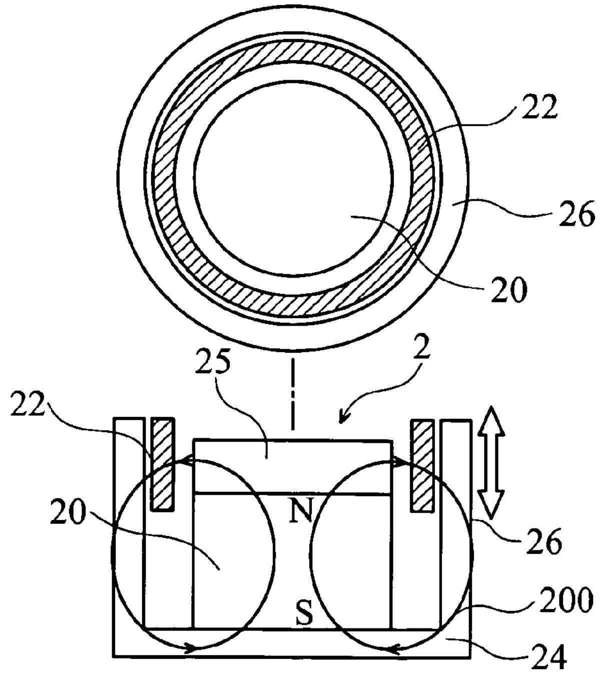
FIG. 2B (RELATED ART)
FIG. 2B is a schematic top and side cross section of yet another conventional magnetic actuator.
Figure 3A:
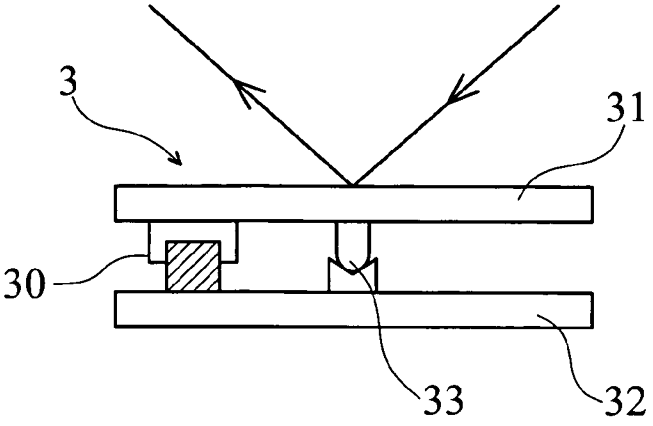
FIG. 3A (RELATED ART)
FIG. 3A is a schematic view of a magnetic actuator applied in a stationary reflecting mirror actuator if the magnetic actuator have not been actuated.
Figure 3B:
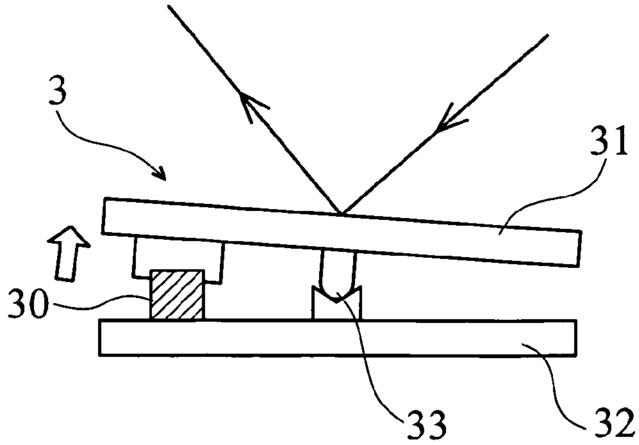
FIG. 3B (RELATED ART)
FIG. 3B is a schematic view of a magnetic actuator applied in a stationary reflecting mirror actuator if the magnetic actuator have been actuated.
Figure 4A:
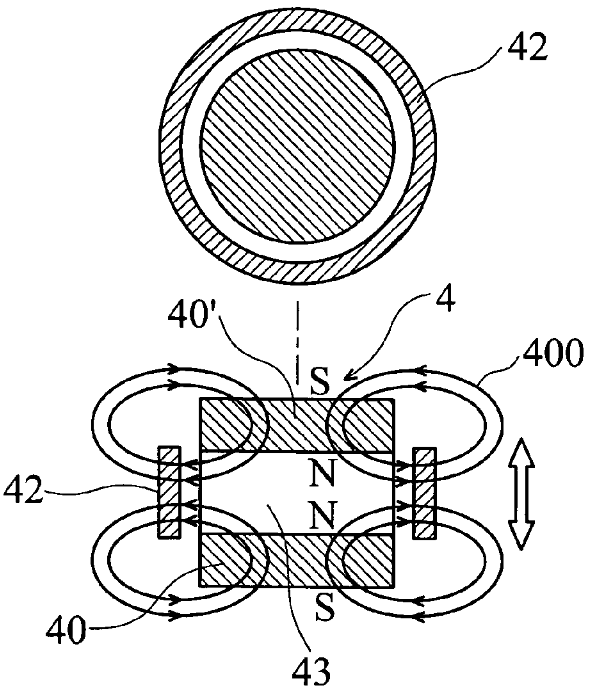
FIG. 4A is a schematic top and side cross section of a magnetic actuator according to a first embodiment of the invention.

FIG. 4A is a schematic top and side cross section of a magnetic actuator according to a first embodiment of the invention. The magnetic actuator 4 comprises a first magnet 40, a second magnet 40', a coil 42, and a yoke 43. The first magnet 40 and the second magnet 40' are axially arranged with repulsion therebetween. In this embodiment, the North pole of the first magnet 40 faces to the North pole of the second magnet 40', generating repulsion therebetween. The yoke 43 is disposed between the first magnet 40 and the second magnet 40'. The coil 42 surrounds and is positioned corresponding to the yoke 43. Since the North poles of two magnets 40, 40' are arranged axially and face to each other, magnetic field line 400 produced from the center of the yoke 43 extends radially out of and around the coil 42, and enters the lower edge (South pole) of first magnet 40 and the upper edge (South pole) of second magnet 40', respectively. Thus, when current flows is occurred through the coil 42, current flows and magnetic field lines are also perpendicular to each other such that the magnetic force will be produced to move the coil 42 axially with respect to the first magnet 40 and the second magnet 40' therefore.

According to the disclosed structure, thicknesses of the first and second magnets 40, 40' are substantially the same. Moreover, the gap therebetween can be less than twice the thickness of the first or second magnet 40, 40'. The reduced gap results in magnetic field lines 400 produced by the first or second magnet 40, 40' being densely formed, extending radially from the yoke 43. As a result, the density of the magnetic field lines 400 is increased. Provided with the same current flow and power supply to the coil 42 without increasing the size of the actuator, the magnetic actuator 4 of the invention provides improved actuation.

The magnetic actuator 4 can be applied in a reflecting mirror actuator of an optical device. Thanks to the above mentioned structure, the size of the magnetic actuator 4 and current flow of the coil can be maintained, to provide improved actuation. Thus, the magnetic actuator 4 satisfies requirements of the reflecting mirror actuator to successfully actuate the reflecting mirror rotating about a pivot point and providing rapid light interchange for higher resolution. The first magnet 40 and first coil 42 of the magnetic actuator 4 can be connected to a base of the reflecting mirror actuator or the mirror. Thus, relative motion is produced between the first and second magnets 40 and 42 for actuating the reflecting mirror rotating about the pivot point.

Figure 4B:
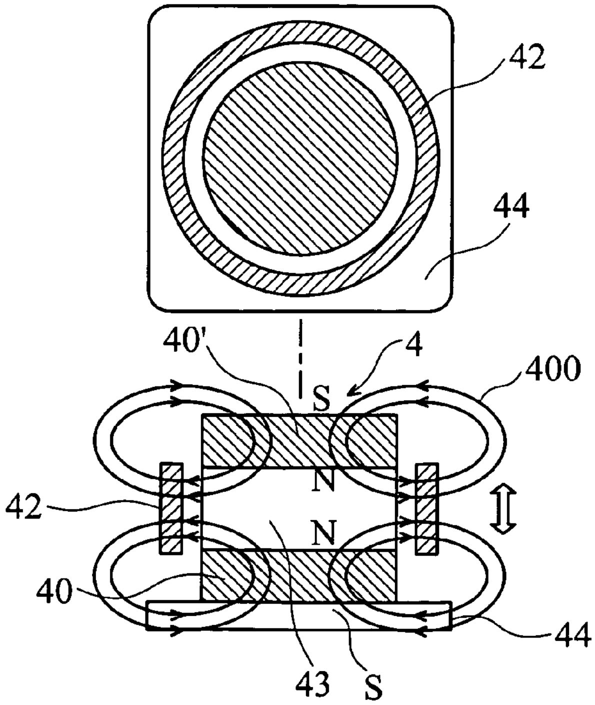
FIG. 4B is a schematic top and side cross section of a magnetic actuator according to a second embodiment of the invention.

FIG. 4B is a schematic top and side cross section of a magnetic actuator according to a second embodiment of the invention. Another magnetic actuator 4 comprises a first magnet 40, a second magnet 40', a coil 42, and a yoke 43, as well as a yoke base 44 connected to a lower edge of the first magnet 40. The yoke base 44 can be permeable such that the density of the magnetic field lines 400 near the coil 42 and the lower edge of the first magnet 40 is increased, providing improved actuation. The yoke base 44 can be rectangular or circular.

Figure 4C:
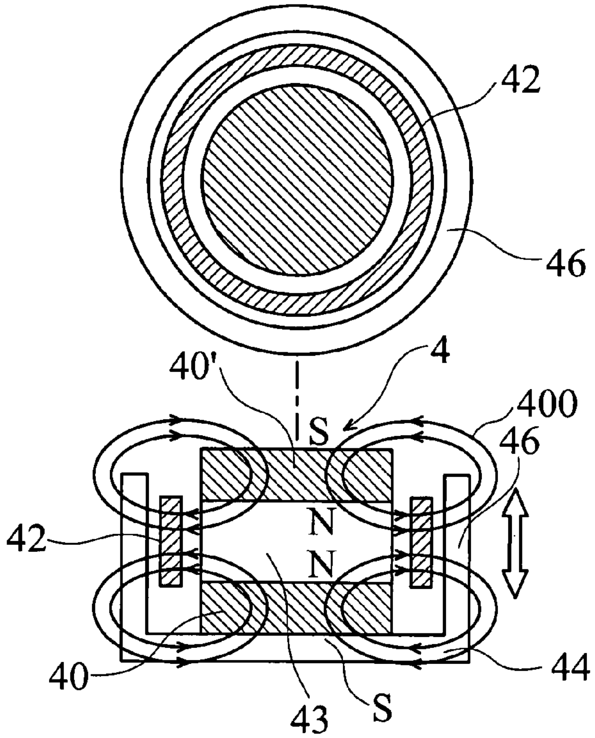
FIG. 4C is a schematic top and side cross section of a magnetic actuator according to a third embodiment of the invention.

FIG. 4C is a schematic top and side cross section of a magnetic actuator according to a third embodiment of the invention. The magnetic actuator 4 comprises a first magnet 40, a second magnet 40', a coil 42, a yoke 43, and a yoke base 44. The difference is that the yoke base 44 further comprises a side board 46 near the first magnet 40. The side board 46 extends axially from the yoke base 44 to the coil 42. In a preferred embodiment, the side board 46 can encircle the first magnet 40 entirely. The side board 46 is of the same permeable material as the yoke base 44. Thus, the magnetic field lines 400 passing through the coil 42 can effectively extend along the side board 46 and the yoke base 44, and return to the lower edge of the first magnet 40. Thus, density of the magnetic field lines 400 is increased, providing improved actuation.

Figure 4D:
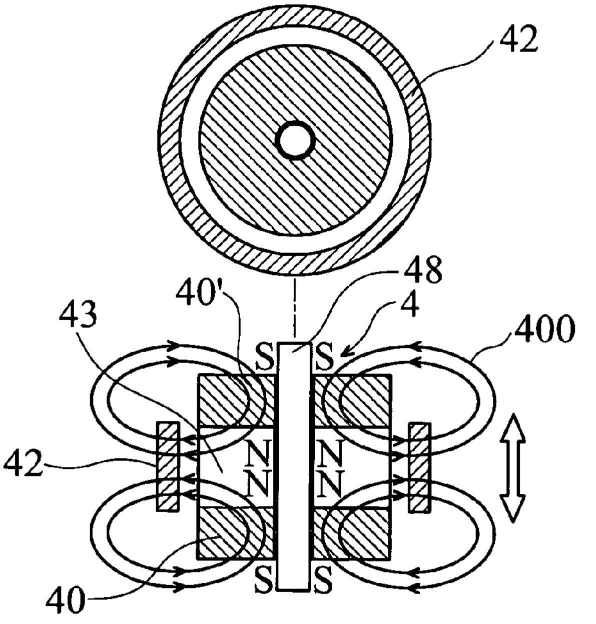
FIG. 4D is a schematic top and side cross section of a magnetic actuator according to a fourth embodiment of the invention.

FIG. 4D is a schematic top and side cross section of a magnetic actuator according to a fourth embodiment of the invention. The magnetic actuator 4 comprises a first magnet 40, a second magnet 40', a coil 42, and a yoke 43. A central shaft 48 connected to the coil 42 penetrates the first magnet 40, the second magnet 40', and the yoke 43. When the magnetic actuator 4 is actuated, a relative axial motion is produced between the central shaft 48 and the coil 42 with respect to the first magnet 40, the second magnet 40', and the yoke 43. In practice, the central shaft 48 and the coil 42 or the first magnet 40, the second magnet 40', and the yoke 43 can be optionally fixed together.

Figure 5:
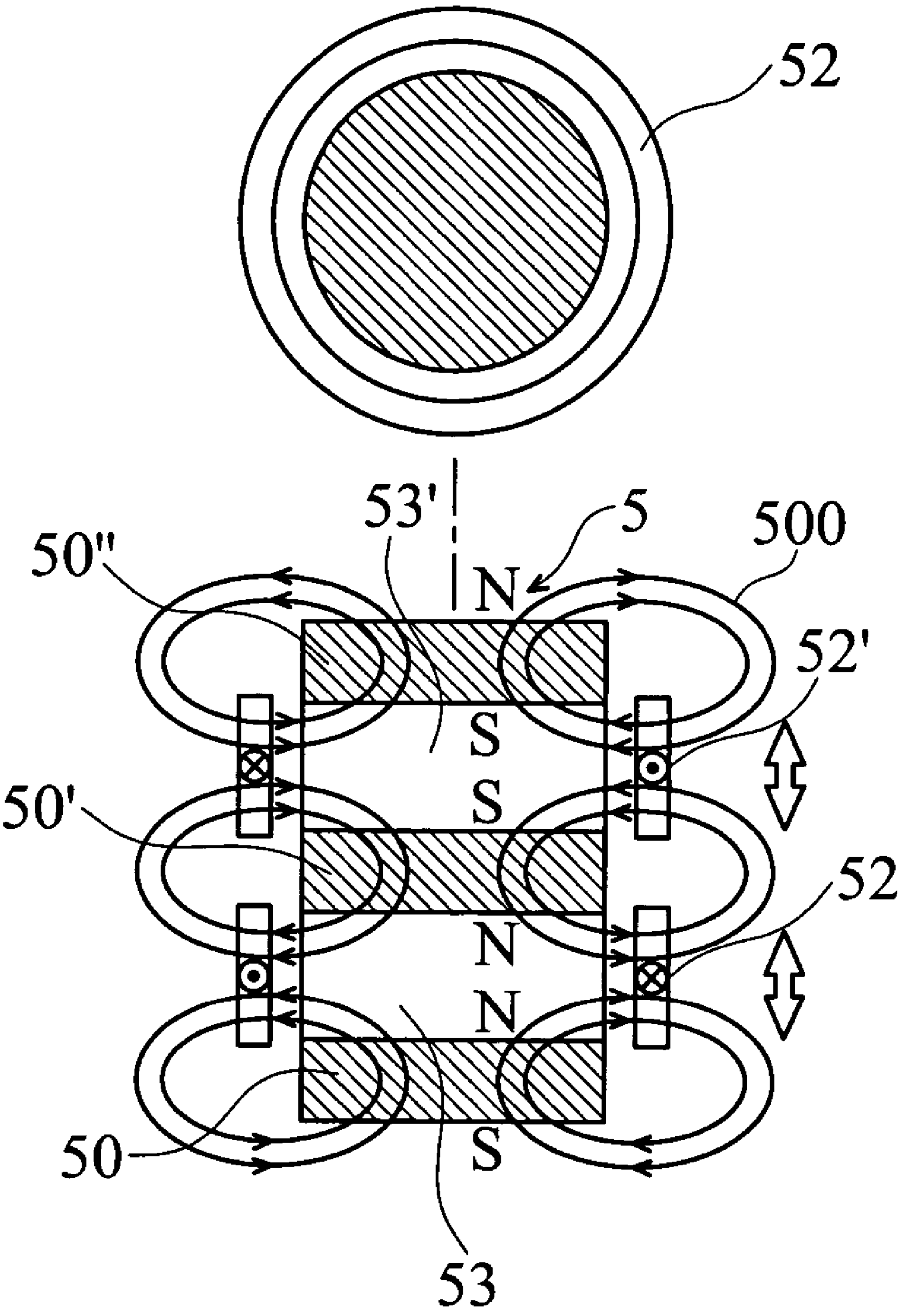
FIG. 5 is a schematic top and side cross section of a magnetic actuator according to a fifth embodiment of the invention.

FIG. 5 is a schematic top and side cross section of a magnetic actuator according to a fifth embodiment of the invention. The magnetic actuator 5 comprises a first magnet 50, a second magnet 50', a third magnet 50", a first coil 52, a second coil 52', a first yoke 53, and a second yoke 53". The first magnet 50 and the second magnet 50' are axially arranged with repulsion therebetween. The second magnet 50' and the third magnet 50" are also axially arranged with repulsion therebetween. In this embodiment, the first magnet 50 has its North pole facing to the North pole of the second magnet 50'. At a meanwhile, the second magnet 50' has its South pole facing to the South pole of the third magnet 50". The first yoke 53 is disposed between the first magnet 50 and the second magnet 50'. The second yoke 53, is disposed between the second magnet 50' and the third magnet 50". The first coil 52 surrounds and positioned corresponding to the first yoke 53. The second coil 52' surrounds and positioned corresponding to the second yoke 53'. Thus, according to the disclosed arrangement, North poles of the first and second magnets 50, 50' face to each other such that the magnetic field lines 400 produced therefrom extend from a center of the first yoke 53, pass through the coil 52, and enter a lower edge (South pole) of the first magnet 50 and an upper edge (South pole) of the second magnet 50'. Meanwhile, South poles of the second and third magnets 50', 50" face each other such that the magnetic field lines 400 emit from a lower edge (North pole) of the second magnet 50' and an upper edge (North pole) of the third magnet, radially pass through the second coil 52', and enter the upper edge (South pole) of the second magnet 50' and the lower edge (South pole) of the third magnet 50". Thus, current through the first coil 52 is perpendicular to the magnetic field lines such that the first magnetic force will be produced to move the first coil 52 axially with respect to the first and second magnets 50, 50'. Moreover, the first magnetic force will be also produced to move the second coil 52' axially with respect to the second and third magnets 50', 50".

As shown in FIG. 5, current flows from the left portion of the first coil 52 in an outward direction perpendicular to paper surface and from the right portion of the first coil 52 into the paper surface. According to the Ampere's Law, current direction of the first coil 52 depends on direction of the magnetic field lines of the first and second magnets 50, 50', and thus, the first coil 52 can move downward axially. Similarly, if current flows out of the paper surface from the right portion of the second coil 52' and perpendicularly therein from the left portion thereof. According to the Ampere's Law, current direction of the second coil 52' depends on direction of the magnetic field lines of the second magnet 50' and the third magnet 50", and thus, the second coil 52' can move downward axially. If the first coil 52 connects to the second coil 52', actuation is doubled. Hence, according to the structure disclosed in the first embodiment, the structure can overlap or be combined to produce multiple actuations to fulfill various requirements of driving elements.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A magnetic actuator, comprising:

a first magnet;

a second magnet, arranged with respect to the first magnet;

a first yoke, disposed between the first magnet and the second magnet; and a first coil, disposed surrounding and corresponding to the first yoke such that when a current is occurred in the first coil, a first magnetic force generated between the first magnet and the second magnet actuates the first coil to move with respect to the first and second magnets.

2. The magnetic actuator as claimed in claim 1, wherein the second magnet is arranged axially with respect to the first magnet with repulsion; and the first coil is actuated to move axially with respect to the first and second magnets.

3. The magnetic actuator as claimed in claim 1, wherein magnetic field lines produced by the first magnet and the second magnet extend from the first yoke.

4. The magnetic actuator as claimed in claim 1, further comprising a yoke base, the first magnet connected thereto.

5. The magnetic actuator as claimed in claim 4, wherein the yoke base comprises a side board extending from the yoke base to the first coil.

6. The magnetic actuator as claimed in claim 5, wherein the side board entirely encircles the first coil.

7. The magnetic actuator as claimed in claim 1, wherein the first magnet and the second magnet have substantially the same thickness, and a gap therebetween is less than twice the thickness of the first magnet or the second magnet.

8. The magnetic actuator as claimed in claim 1, further comprising a third magnet arranged with respect to the second magnet; a second yoke disposed between the second magnet and the third magnet; and a second coil, disposed surrounding and corresponding to the second yoke, such that when a current is occurred in the second coil, a second magnetic force generated between the second magnet and the third magnet actuates the second coil to move with respect to the second and third magnets.

9. The magnetic actuator as claimed in claim 8, wherein the third magnet is arranged axially with respect to the second magnet with repulsion; and the second coil is actuated to move axially with respect to the second and third magnets.

10. The magnetic actuator as claimed in claim 8, wherein the magnetic field lines produced by the second magnet and the third magnet extend from the second yoke.

11. The magnetic actuator as claimed in claim 8, wherein a current flow of the second coil is opposite to the first coil such that the first and second coils are in a simultaneous motion.

12. The magnetic actuator as claimed in claim 8, wherein the second magnet and the third magnet have substantially the same thickness, and a gap therebetween is less than twice the thickness of the second magnet or the third magnet.

13. The magnetic actuator as claimed in claim 1, further comprising a central shaft penetrating the first magnet, the first yoke, and the second magnet and connecting to the first coil such that the central shaft and the first coil move simultaneously and with respect to the first magnet, the second magnet, and the first yoke.

14. A reflecting mirror actuator, applied in an optical device, comprising:

a base;

a reflecting mirror, connected to the base at a pivot point; and a magnetic actuator, disposed between the base and the reflecting mirror, rotating the reflecting mirror by the pivot point, wherein the magnetic actuator comprises:

a first magnet;

a second magnet arranged with respect to the first magnet;

a first yoke disposed between the first magnet and the second magnet; and a first coil disposed surrounding and corresponding to the first yoke, such that when a current is occurred in the first coil, a first magnetic force generated between the first magnet and the second magnet actuates the first coil to move with respect to the first and second magnets.

15. The reflecting mirror actuator as claimed in claim 14, wherein the second magnet is arranged axially with respect to the first magnet with repulsion; and the first coil is actuated to move axially with respect to the first and second magnets.

16. The reflecting mirror actuator as claimed in claim 14, wherein the magnetic field lines produced by the first magnet and the second magnet extend from the first yoke.

17. The reflecting mirror actuator as claimed in claim 14, further comprising a yoke base, the first magnet connected thereto.

18. The reflecting mirror actuator as claimed in claim 14, wherein the yoke base comprises a side board extending from the yoke base to entirely encircle the first coil.

19. The reflecting mirror actuator as claimed in claim 14, wherein the first magnet and the second magnet have substantially the same thickness, and a gap therebetween is less than twice the thickness of the first magnet or the second magnet.

20. The reflecting mirror actuator as claimed in claim 14, further comprising a third magnet arranged with respect to the second magnet; a second yoke disposed between the second magnet and the third magnet; and a second coil, disposed surrounding and corresponding to the second yoke, such that when a current is occurred in the second coil, a second magnetic force generated between the second magnet and the third magnet actuates the second coil to move with respect to the second and third magnets.

21. The reflecting mirror actuator as claimed in claim 20, wherein the second magnet and the third magnet have substantially the same thickness, and a gap therebetween is less than twice the thickness of the second magnet or the third magnet.

22. The reflecting mirror actuator as claimed in claim 14, further comprising a central shaft penetrating the first magnet, the first yoke, and the second magnet and connecting to the first coil such that the central shaft and the first coil move simultaneously and with respect to the first magnet, the second magnet, and the first yoke.

* * * * *